United States Patent
Segev et al.

(10) Patent No.: US 11,733,920 B2
(45) Date of Patent: Aug. 22, 2023

(54) NVME SIMPLE COPY COMMAND SUPPORT USING DUMMY VIRTUAL FUNCTION

(71) Applicant: Western Digital Technologies, Inc., San Jose, CA (US)

(72) Inventors: Amir Segev, Meiter (IL); Shay Benisty, Beer Sheva (IL)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 17/182,027

(22) Filed: Feb. 22, 2021

(65) Prior Publication Data

US 2022/0075560 A1    Mar. 10, 2022

Related U.S. Application Data

(60) Provisional application No. 63/076,780, filed on Sep. 10, 2020.

(51) Int. Cl.
*G06F 3/06* (2006.01)
*G06F 13/16* (2006.01)

(52) U.S. Cl.
CPC .......... *G06F 3/0659* (2013.01); *G06F 3/0604* (2013.01); *G06F 3/0652* (2013.01); *G06F 3/0656* (2013.01); *G06F 3/0679* (2013.01); *G06F 13/1668* (2013.01)

(58) Field of Classification Search
CPC .... G06F 3/0659; G06F 3/0604; G06F 3/0652; G06F 3/0656; G06F 3/0679; G06F 12/1668
USPC ......................................................... 711/103
See application file for complete search history.

(56) References Cited

U.S. PATENT DOCUMENTS

| | | | |
|---|---|---|---|
| 7,958,430 B1 | 6/2011 | Kolokowsky et al. | |
| 10,007,443 B1 | 6/2018 | Rajadnya et al. | |
| 10,185,658 B2 | 1/2019 | O'Krafka et al. | |
| 10,452,278 B2 | 10/2019 | Benisty | |
| 10,564,872 B2 | 2/2020 | Benisty | |
| 2006/0187908 A1 | 8/2006 | Shimozono et al. | |
| 2009/0319720 A1* | 12/2009 | Stefanus | G06F 12/0246 711/E12.083 |
| 2013/0138904 A1 | 5/2013 | Min | |
| 2016/0004438 A1 | 1/2016 | Moon et al. | |
| 2016/0224248 A1 | 8/2016 | Choi et al. | |
| 2017/0220292 A1* | 8/2017 | Hashimoto | G06F 3/0641 |

(Continued)

FOREIGN PATENT DOCUMENTS

KR    101750744 B1    6/2017

OTHER PUBLICATIONS

International Search Report and Written Opinion for PCT/US2022/013917 dated May 22, 2022.

*Primary Examiner* — Gautam Sain
(74) *Attorney, Agent, or Firm* — Patterson + Sheridan, LLP; Steven H. VerSteeg

(57) ABSTRACT

The present disclosure generally relates to data storage devices, such as solid state drives. The data storage device includes a volatile memory, a non-volatile storage unit, and a controller. The data storage device further includes a plurality of virtual functions, where at least one of the virtual functions is only accessible by the data storage device and the remainder of the virtual functions are accessible by both the data storage and a host device. At least one of the virtual functions may be dedicated to completing data storage device storage management operations.

20 Claims, 8 Drawing Sheets

(56) References Cited

U.S. PATENT DOCUMENTS

| | | | |
|---|---|---|---|
| 2018/0089297 A1 | 3/2018 | Dong et al. | |
| 2018/0150243 A1* | 5/2018 | Beard | G06F 12/02 |
| 2018/0260145 A1* | 9/2018 | Margetts | G06F 13/16 |
| 2018/0321987 A1* | 11/2018 | Benisty | G06F 3/0659 |
| 2019/0065102 A1* | 2/2019 | Shin | G06F 3/0656 |
| 2019/0079702 A1 | 3/2019 | Yeon et al. | |
| 2019/0146684 A1 | 5/2019 | Benisty et al. | |
| 2019/0272119 A1* | 9/2019 | Brewer | G06F 9/30076 |
| 2019/0294344 A1* | 9/2019 | Hahn | G06F 3/0679 |
| 2020/0019542 A1 | 1/2020 | Brown et al. | |
| 2020/0241798 A1 | 7/2020 | Kanno | |
| 2021/0191657 A1* | 6/2021 | Moss | G06F 3/0656 |
| 2022/0057959 A1* | 2/2022 | Yang | G06F 3/0655 |

* cited by examiner

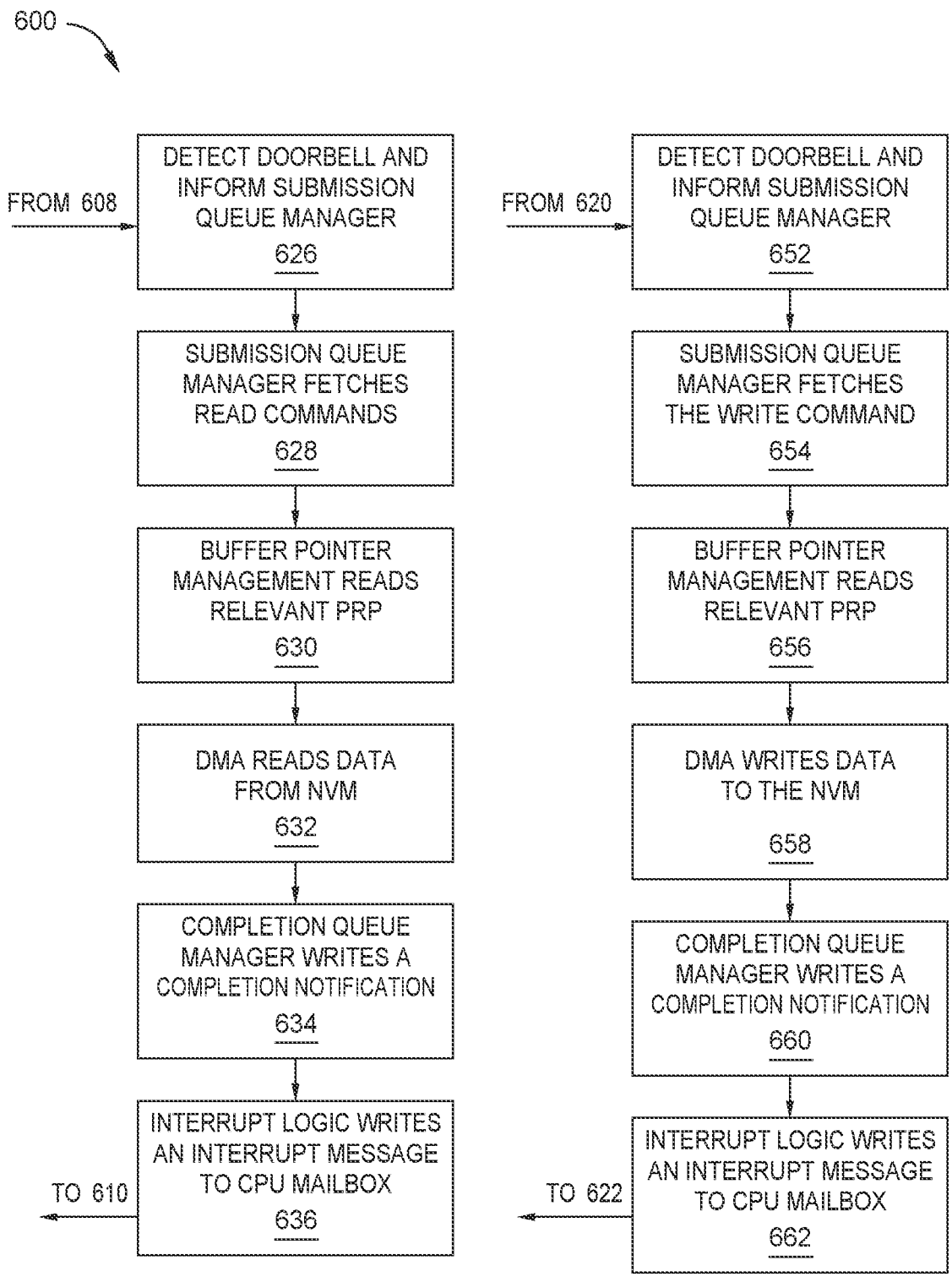

NVME SIMPLE COPY COMMAND SUPPORT USING DUMMY VIRTUAL FUNCTION

CROSS-REFERENCE TO RELATED APPLICATIONS

This application claims benefit of U.S. provisional patent application Ser. No. 63/076,780, filed Sep. 10, 2020, which is herein incorporated by reference.

BACKGROUND OF THE DISCLOSURE

Field of the Disclosure

Embodiments of the present disclosure generally relate to data storage devices, such as solid state drives (SSDs).

Description of the Related Art

Data storage devices, such as SSDs, may be used in computers in applications where relatively low latency and high capacity storage are desired. For example, SSDs may exhibit lower latency, particularly for random reads and writes, than hard disk drives (HDDs). Typically, a controller of the SSD receives a command to read or write data from a host device to a memory device. The data is read from or written to one or more blocks in the memory device depending upon whether the command is a read or write command.

The data storage device utilizes storage management operations, such as garbage collection, to free up valuable space. As updated data is written to the one or more blocks of the memory device, the previous versions of the updated data may no longer be needed. Garbage collection may re-allocate one or more blocks, one erased, to an available pool of empty blocks. Furthermore, the relevant data previously stored on the one or more blocks may be re-written to one or more blocks sequentially. The copying of data, which might happen due to a host device command or an internal decision, may utilize one or more buffers and hardware engines, which may cause a delay in completing read/write commands received from the host.

Therefore, there is a need for an improved method to concurrently complete host commands and data storage device operations.

SUMMARY OF THE DISCLOSURE

The present disclosure generally relates to data storage devices, such as solid state drives. The data storage device includes a volatile memory, a non-volatile storage unit, and a controller. The data storage device further includes a plurality of virtual functions, where at least one of the virtual functions is only accessible by the data storage device and the remainder of the virtual functions are accessible by both the data storage and a host device. At least one of the virtual functions may be dedicated to completing data storage device storage management operations.

In one embodiment, a data storage device includes a non-volatile storage unit and a volatile memory unit, including one or more first volatile memory locations, one or more second volatile memory locations and a controller memory buffer (CMB). The data storage device further includes a controller coupled to the non-volatile storage unit and the volatile memory unit. The controller is configured to receive one or more host commands, such as a simple copy command that includes both read and write commands as sub-parts of the host commands, from a host to read data from or write data to the non-volatile storage unit, route the received one or more read or write commands to one or more first virtual function locations, and utilize the CMB to copy the data from a first location of the non-volatile storage unit to a second location of the non-volatile storage unit, where copying the data from the first location to the second location utilizes one or more second virtual function locations. The controller is also configured to initiate a garbage collection command.

In another embodiment, a data storage device includes a non-volatile storage unit and a volatile memory unit, including one or more first volatile memory locations, one or more second volatile memory locations, and a controller memory buffer (CMB). The data storage device further includes an inbound multiplexer (mux), such as an advanced extensible interface (AXI) mux, and a controller coupled to the non-volatile storage unit, the volatile memory unit, and the AXI inbound mux. The data storage device further includes a central processing unit (CPU) coupled to the controller, where the CPU is configured to receive a copy command or a self-generated garbage collection decision from the controller, generate a plurality of read commands, write the plurality of read commands to the CMB, generate physical region page (PRP) or scatter gather lists (SGLs) for the plurality of read commands pointing to the CMB, issue a first doorbell for the plurality of read commands, generate a first write command, generate PRPs for the first write command pointing to the CMB, issue a second doorbell for the first write command, and program the data associated with the first write command to the non-volatile storage.

In another embodiment, a data storage device includes a non-volatile storage unit, a volatile memory unit, including one or more first volatile memory locations and one or more second volatile memory locations, means to route one or more read or write commands received from a host to one or more first virtual function locations, where the one or more first virtual function locations completes the one or more read or write commands received, and a controller memory buffer (CMB) to copy data from a first location of the non-volatile storage unit to a second location of the non-volatile storage unit, where copying the data from the first location to the second location utilizes one or more second virtual function locations.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 6A-6C illustrate a method for a copy command flow, according to disclosed embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives. The data storage device includes a volatile memory, a non-volatile storage unit, and a controller. The data storage device further includes a plurality of virtual functions, where at least one of the virtual functions is only accessible by the data storage device and the remainder of the virtual functions are accessible by both the data storage and a host device. At least one of the virtual functions may be dedicated to completing data storage device storage management operations.

It should be understood that while the description herein will make reference to write commands and read commands to support copy commands, the disclosure herein is not to be limited to such commands. Rather, the disclosure herein is understood to cover other commands such as verify commands or compare commands. Additionally, commands that require reading from the memory device, such as a NAND device, but not transferring any data to the host device are also contemplated.

Figure 1:
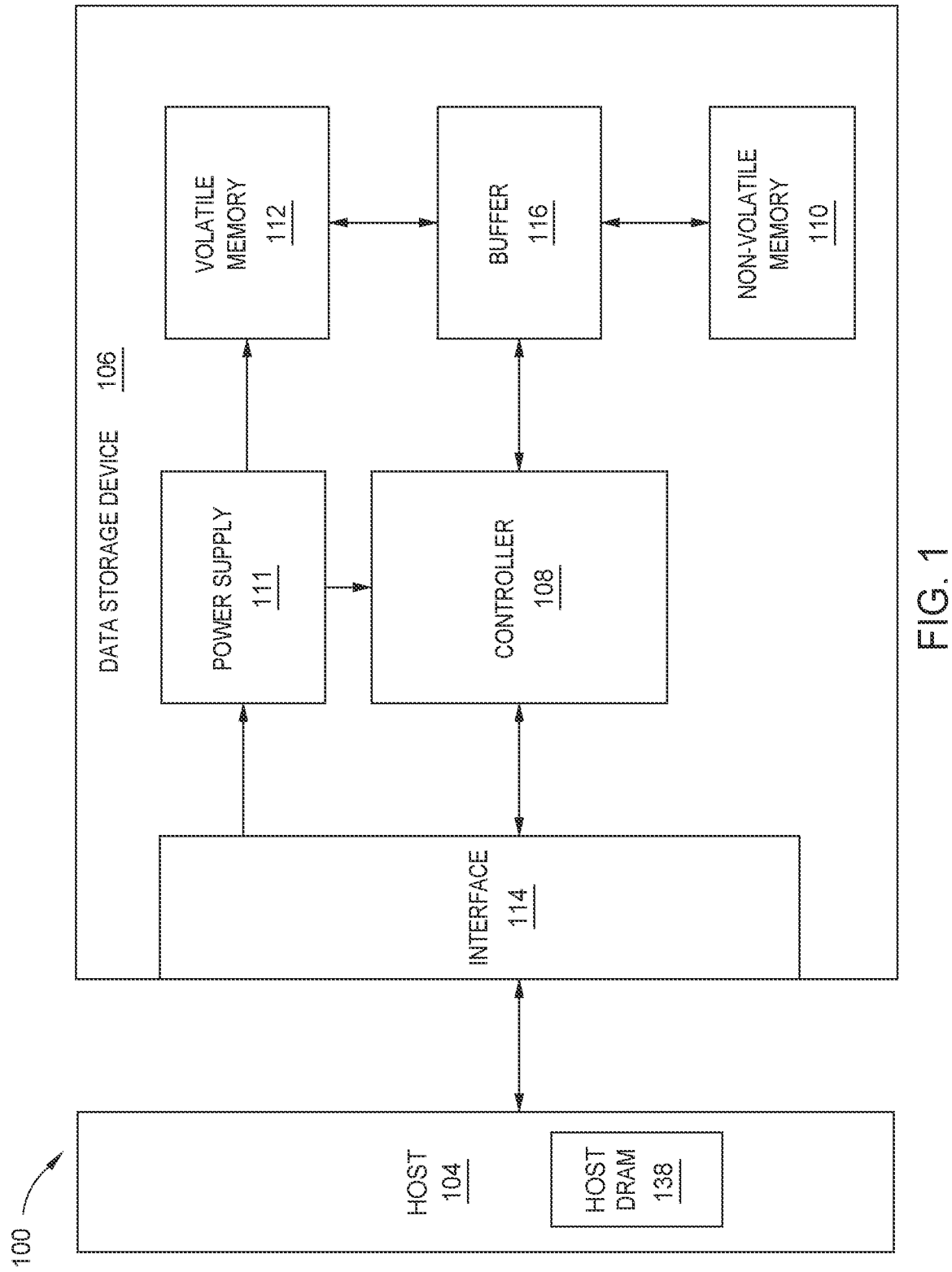
FIG. 1 is a schematic block diagram illustrating a storage system in which data storage device may function as a storage device for a host device, according to disclosed embodiments.

FIG. 1 is a schematic block diagram illustrating a storage system 100 in which data storage device 106 may function as a storage device for a host device 104, according to disclosed embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The NVM 110 may include a plurality of memory devices. NVM 110 may be configured to store and/or retrieve data. For instance, a memory device of NVM 110 may receive data and a message from the controller 108 that instructs the memory device to store the data. Similarly, the memory device of NVM 110 may receive a message from the controller 108 that instructs the memory device to retrieve data. In some examples, each of the memory devices may be referred to as a die. In some examples, a single physical chip may include a plurality of dies (i.e., a plurality of memory units). In some examples, each memory device may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory device of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory or write buffer 116 before sending the data to the NVM 110.

Figure 2A:
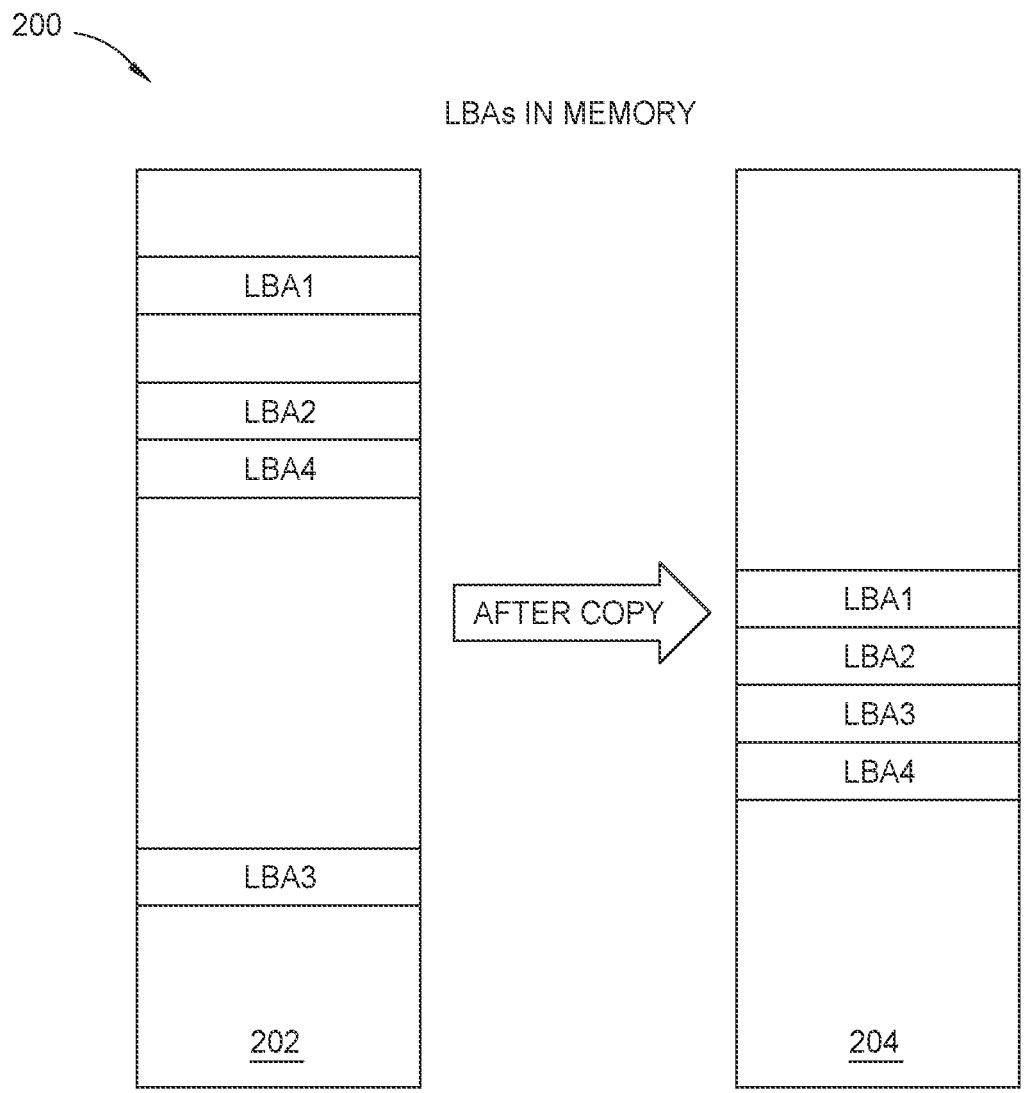
FIG. 2A is an illustration of a storage management operation, according to disclosed embodiments.

FIG. 2A is an illustration of a storage management operation, according to disclosed embodiments. The NVM, such as the NVM 110 of FIG. 1, of the data storage device, such as the data storage device 106 of FIG. 1, includes a first block 202 and a second block 204. Because data is written to blocks sequentially, the space between LBA1 and LBA2 and the space between LBA4 and LBA3 of the first block 202, prior to moving data or garbage collection, may contain invalid or old data. Any additional data written to the first block 202 is written after LBA3. Thus, the space between LBA1 and LBA2 and LBA4 and LBA3 is not effectively utilized because the valid data is not sequential, and the space between the LBAs cannot be used.

The controller, such as the controller 108 of FIG. 1, or the host device 104 of FIG. 1, may send commands for storage management operations, such as garbage collection. The LBAs of the first block 202 are copied to the controller, where the LBAs may be stored in a volatile memory of the controller. The first block is erased and allocated to the pool of free blocks (i.e., blocks not yet written to). The data stored in the controller is written sequentially to the second block 204. Because the data is written sequentially to the second block, the amount of space that the data utilizes decreases as the data is more consolidated on the block. For example, the first block 202 may have 64 KiB of available capacity. Each LBA has a size of about 4 KiB. The total size of the LBAs is 16 KiB. The first block 202 remaining capacity after the four LBAs have been written to the first block 202 is about 48 KiB. However, because the four LBAs are not written sequentially, the usable capacity may be less than about 48 KiB. When writing data sequentially to a block, such as the second block 204, the usable capacity may be equal or about equal to the remaining capacity of the block.

Figure 2B:
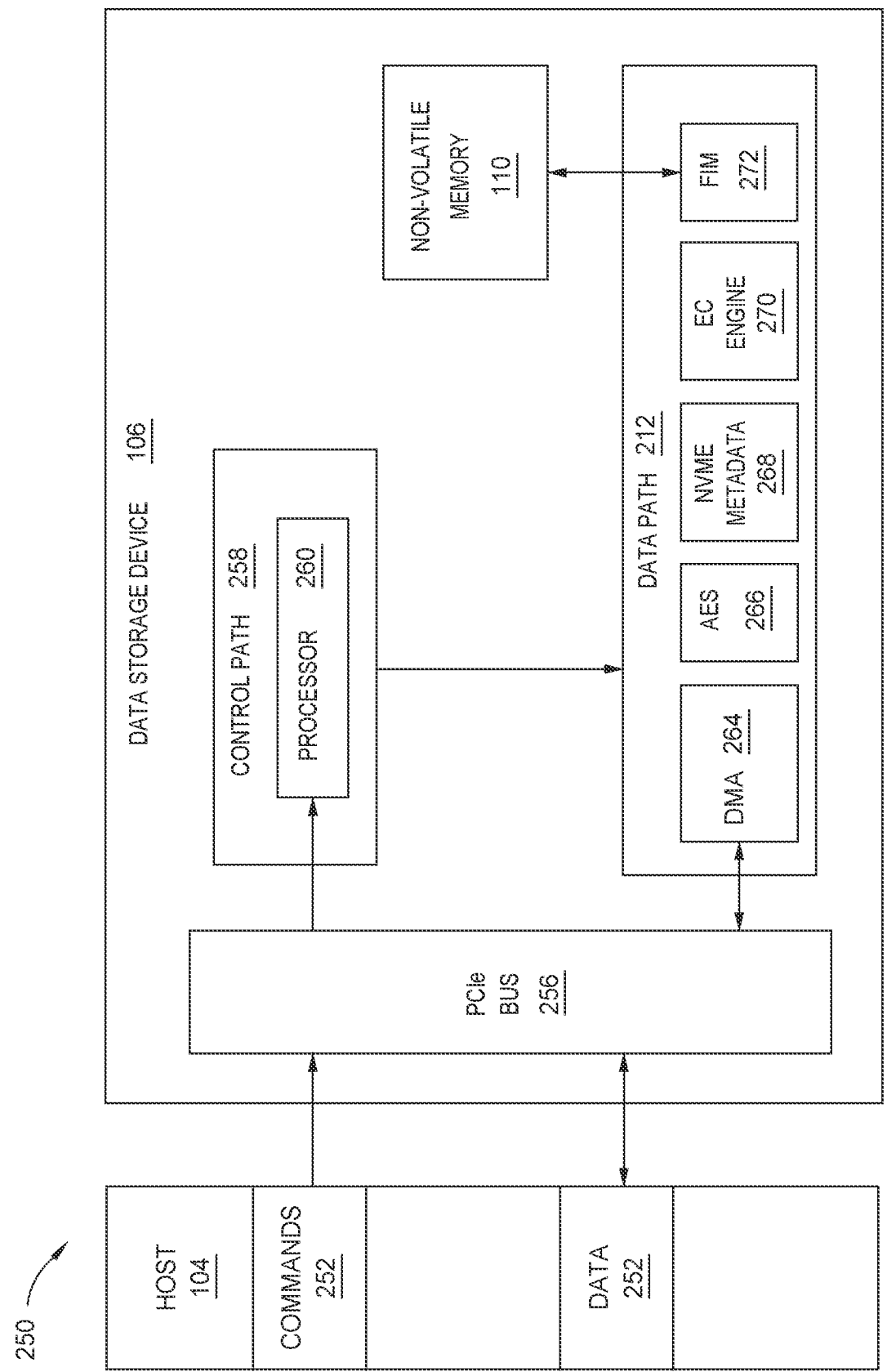
FIG. 2B is a schematic block diagram illustrating a storage management operation in a data storage device, according to disclosed embodiments.

FIG. 2B is a schematic block diagram illustrating a storage management operation in a data storage device, according to disclosed embodiments. The host device 104 issues read and/or write commands 252 to the data storage device 106. The PCIe bus 256 receives the commands 252 and the data 254 associated with the commands 252. The commands 252 are then transferred to the control path 258, where a processor 260 includes logic to process and execute the command 252. In a write operation, the data 254 is transferred to the data path 212, where instructions from the processor 260 are executed and the data 254 passes through the various elements of the data path 212. For example, the data 254 first passes through a direct memory access (DMA)

264, where data protection is added to the data 254. The data 254 is then encrypted at the advanced encryption standard (AES) 266. At the NVMe metadata block 268, metadata is appended to the data 254. In one embodiment, the metadata may include a header. The error-correction engine 270, which may be referred to as an EC Engine, generates and writes error-correction code or parity data to the data 254. The flash interface module (FIM) 272 writes the data 254 to the relevant location of the NVM 110.

However, when the data storage device 106 executes a storage management operation, such as garbage collection, the relevant data 254 is retrieved from the NVM 110 and is passed through the flash interface module (FIM) 272, error-correction engine 270, the NVMe metadata block 268, the AES 266, and the DMA 264. The relevant data then passes through the entire data path 212 and is stored at the relevant location in the NVM 110. Because the data path 212 may be occupied with storage management operations, new commands 252 may be queued because of the resources of the data storage device are currently utilized.

Figure 3A:
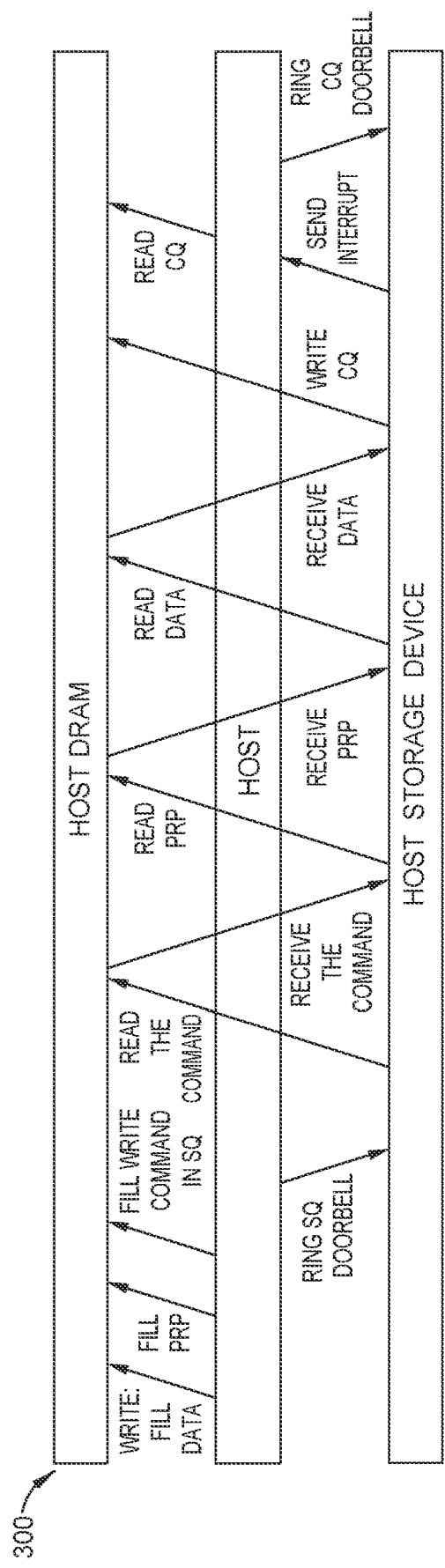
FIG. 3A is a schematic illustration of a write command flow, according to disclosed embodiments.

FIG. 3A is a schematic illustration of a write command flow 300, according to disclosed embodiments. A host device, such as the host device 104 of FIG. 1, includes a host DRAM, such as the host DRAM 138 of FIG. 1. The host device communicates with the data storage device by the way of a data bus. Though the write command flow 300 describes the data flow of a write command between the host device and the data storage device, the command flow may describe the data flow of a read command between the host device and the data storage device.

The host device issues a write command to write data with the associated physical region page (PRP) or scatter gather lists (SGLs) to the host DRAM. It is to be understood that the terms PRPs and SGLs can be used interchangeably. It is also to be understood that for purposes of this disclosure the terms PRPs and SGLs are intended to include alternatively such as would be utilized in NVMe. The host device issues a submission queue (SQ) doorbell to the data storage device. The data storage device responds and reads the command written to the host DRAM. The data storage device receives the write command and reads the relevant PRPs from the host DRAM. The relevant PRPs from the host DRAM are received by the data storage device. The data storage device then reads and receives the data associated with the write command from the host DRAM. After receiving the data from the host DRAM, the data storage device issues a completion notification to the completion queue (CQ) of the host DRAM. The data storage device also sends an interrupt to the host device as an indication that a completion notification has been posted to the host DRAM. The host device then reads and analyzes the relevant completion notification from the host DRAM and issues a CQ doorbell to the data storage device, indicating that the completion notification has been read.

Figure 3B:
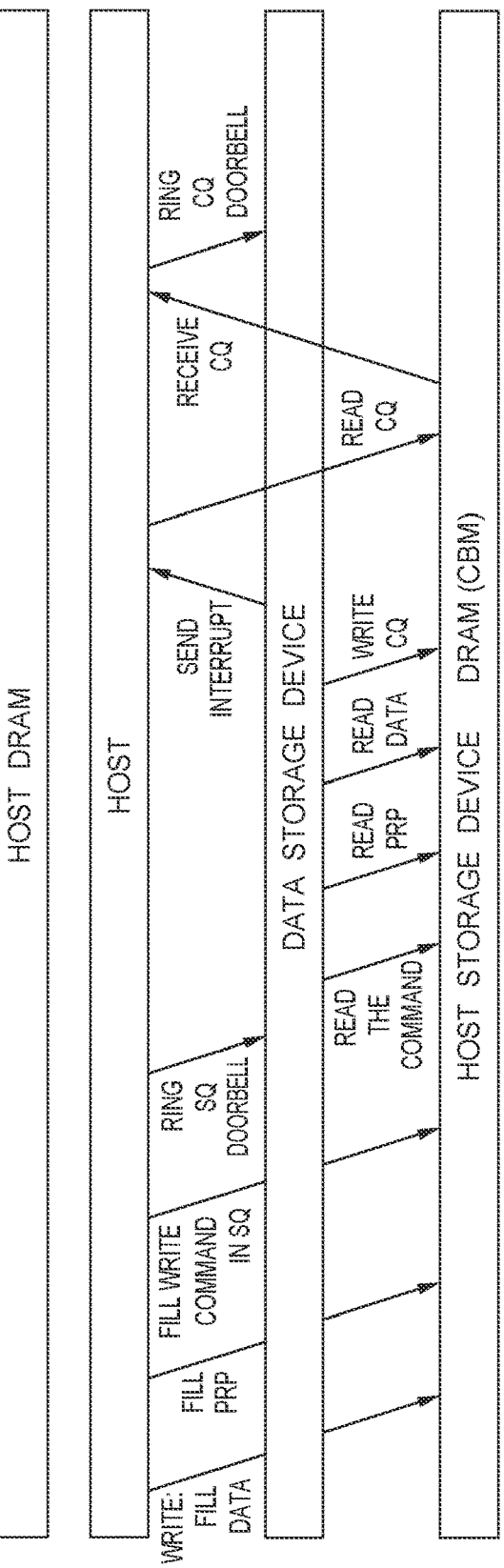
FIG. 3B is a schematic illustration of a write command flow with a controller memory buffer, according disclosed embodiments.

FIG. 3B is a schematic illustration of a write command flow with a controller memory buffer 350, according to disclosed embodiments. Though the write command flow with the CMB 350 describes the data flow of a write command between the host device and the data storage device, the command flow may describe the data flow of a read command between the host device and the data storage device. The host device issues a write command to write data with the associated PRPs. Rather than writing to the host DRAM, the data storage device includes a controller memory buffer (CMB) functionality to provide access to the host device a portion of the DRAM of the data storage device. For example, in the write command flow 300 of FIG. 3A, the write command is written to the host DRAM, where the data storage device reads from the host DRAM.

In the write command flow with the CMB 350, the host device writes the write command and the relevant PRPs to the CMB of the data storage device. The host device then fills the write command in the submission queue. The host device issues a SQ doorbell to the data storage device. The data storage device then reads the write command with the associated PRPs and data from the CMB. The data storage device writes a completion notification to the CQ of the CMB. An interrupt is sent to the host device. When the host device receives the interrupt, the host device reads and receives the completion notification from the CQ of the CMB. The host device then issues a CQ doorbell to the data storage device, indicating that the completion notification has been read. Because the data is written to the CMB of the data storage device, the number of transactions and the time associated with the transactions between the host device and the data storage device may be reduced, thus speeding the process of a read or write command.

Figure 4:
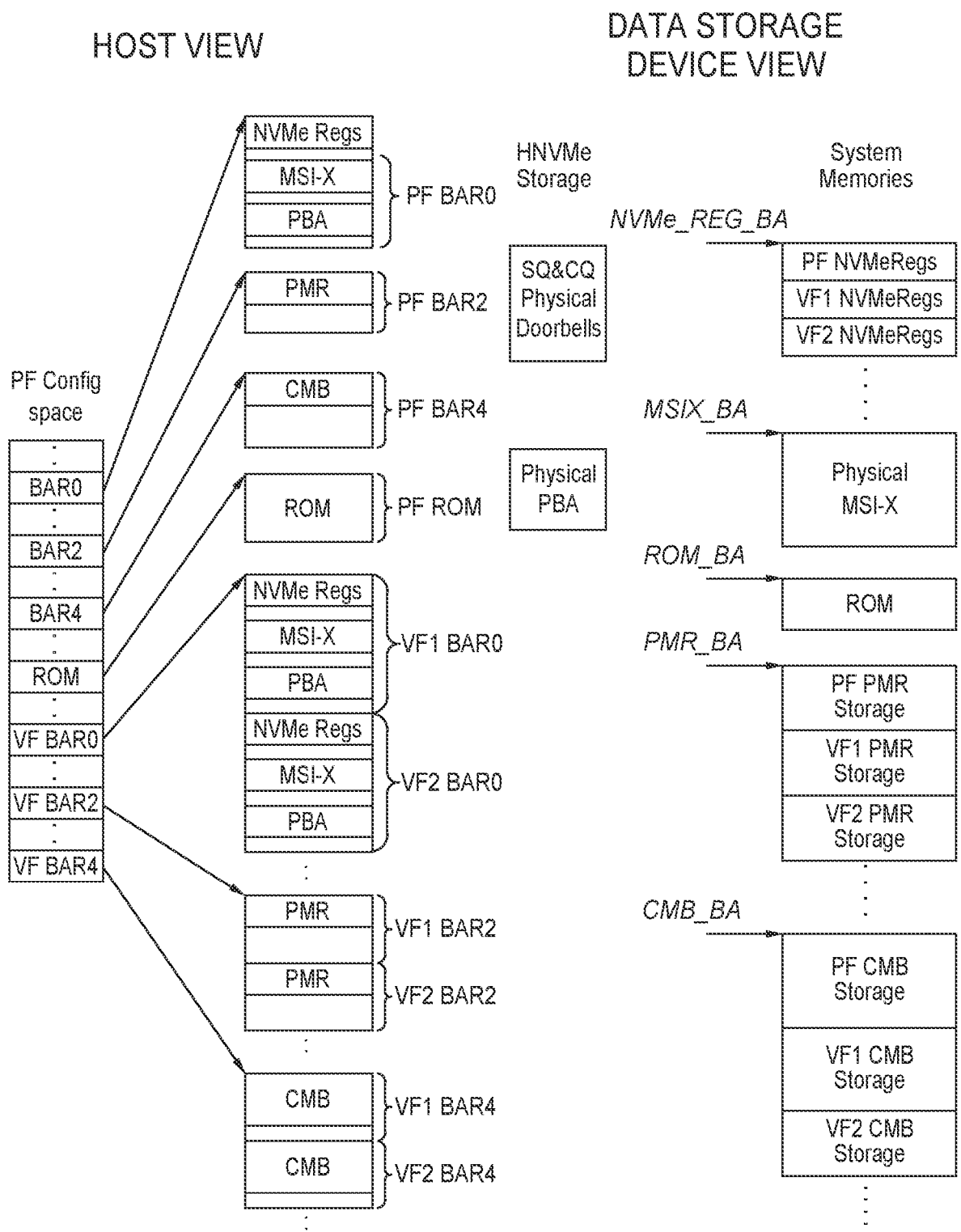
FIG. 4 is a schematic illustration of a host device view and a data storage device view of the virtualization resources, according to disclosed embodiments.

FIG. 4 is a schematic illustration of a host device view and a data storage device view of the virtualization resources, according to disclosed embodiments. The host device may be the host device 104 of FIG. 1 and the data storage device may be the data storage device 106 of FIG. 1. Virtualization functionality allows a number of virtual functions to manage the resources of the data storage device appropriated to each of the virtual functions. As shown in FIG. 4, each virtual function of the host includes a set of registers, doorbells, CMBs, SQs, and CQs that are distinct from the other virtual function. Thus, the resources of each of the virtual functions are isolated from each other.

Figure 5:
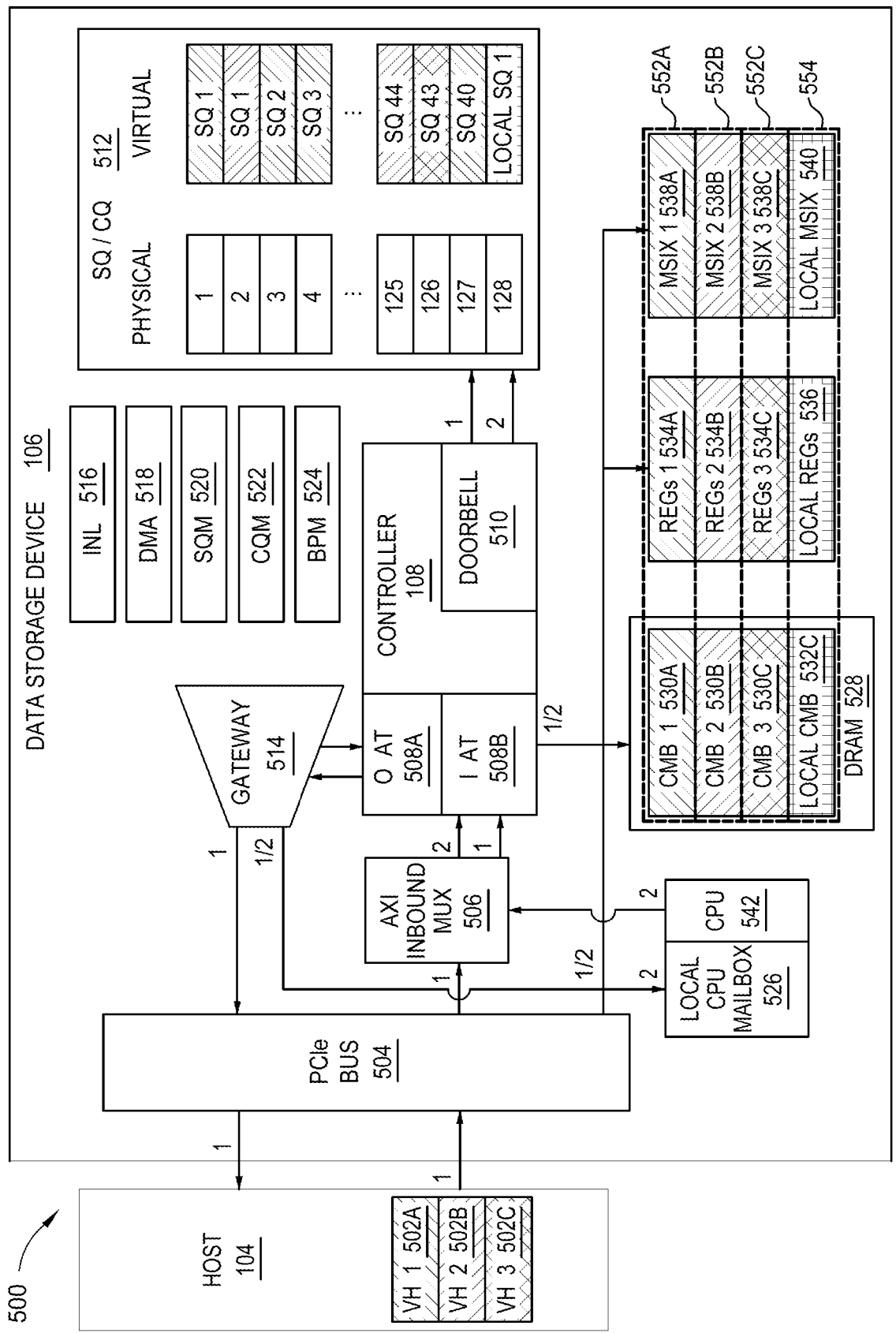
FIG. 5 is a schematic block diagram illustrating a data storage device including a local virtual function protocol, according to disclosed embodiments.

FIG. 5 is a schematic block diagram illustrating a data storage device 106 including a local virtual function protocol, according to disclosed embodiments. The host device 104 includes a set of virtual hosts 502A-502C, each associated with a virtual function. Furthermore, the data storage device 106 may include one or more first virtual functions 552A-552C and one or more second virtual functions 554. The one or more first virtual functions 552A-552C may be accessible by the host device 104 and the one or more second virtual functions 554 may only be accessible by the data storage device, such as the CPU 542 of the data storage device 106 which controls the one or more second virtual functions. The one or more second virtual functions 554 may mimic host device 104 behavior, such as generating read and write commands.

For example, the write command flow with a CMB 350 of FIG. 3 may utilize the one or more first virtual functions 552A-552C. The on one or more second virtual functions 554 may behave similarly to the one or more first virtual functions 552A-552C. However, the one or more second virtual functions 554 may be utilized for data storage device 106 initiated operations or storage management operations, such as garbage collection. Because the resources of the one or more second virtual functions 554 are not shared with the host device 104, the operations of the one or more second virtual functions 554 may occur concurrently with the operations of the one or more first virtual functions 552A-552C.

In FIG. 5, each virtual function is indicated by a unique pattern. For example, the one or more first virtual functions 552A-552C are indicated by a diagonal striped pattern and the one or more second virtual functions 554 are indicated by a horizontal and/or vertical pattern. A first, first virtual function 552A corresponds with first virtual host (VH) 1 502A, a second, first virtual function 552B corresponds with a second VH 2 502B, and a third, first function 552C corresponds with a third VH 3 502C. The listed number of virtual hosts and virtual functions are not intended to be limiting, but to provide an example of a possible embodiment. The resources of the one or more second virtual function 554 (i.e., the local virtual function), indicated by a checkered design, is hidden from the host device 104, whereas the one or more first virtual functions 552A-552C may be accessed by the host device 104.

Furthermore, the flow path 1 is associated with host device 104 read and write commands and the flow path 2 is associated with data storage device 106 read and write commands. The flow path 1 may access any of the one or more first virtual functions 552A-552C and the flow path 2 may access any of the one or more second virtual functions 554.

The data storage device 106 includes a PCIe bus 504, an advanced extensible interface (AXI) inbound multiplexer (mux) module 506, a controller 108, a gateway 514, a SQ/CQ 512, a DRAM 528, and a CPU 542 coupled to a local CPU mailbox 526. The AXI inbound mux module 506 may be responsible for filtering host device 104 commands from the CPU 542 commands. The controller 108 includes an outbound address translation (AT) 508A, an inbound AT 508B, and a doorbell issuer 510. The outbound AT 508A may be configured to send and receive messages to the gateway 514, where the messages may be a completion notification or an interrupt. The inbound AT 508B may be configured to receive read or write commands from the AXI inbound mux 506. The doorbell issuer 510 issues a doorbell for the completion notification or the interrupt to the SQ/CQ 512. The gateway 514 may be configured to direct the read or write transaction to either the host device 104 or the CMB 530a-530c, 532 of the data storage device 106 DRAM 528. In another embodiment, a SRAM is utilized as the DRAM 528.

The DRAM 528 may include a plurality of CMBs 530a-530c, 532. Furthermore, the DRAM 528 may be include one or more first volatile memory locations and one or more second volatile memory locations. For example, the one or more first volatile memory locations may store the plurality of CMBs 530a-530c associated with the one or more first virtual functions 552A-552C and the one or more second volatile memory locations may store the local CMB 532 associated with the one or more second virtual functions 554. As illustrated in FIG. 4, each virtual function may be associated with a unique set of resources, such as a register 534a-534c, 536 and a MSIX 538A-538C, 540. The local resources, such as the local CMB 532, the local register 536, and the local MSIX 540, may only be accessible by the CPU 542 or the firmware of the data storage device 106.

The data storage device 106 further includes an interrupt logic (INL) 516, a direct memory access (DMA) 518, a SQ manager (SQM) 520, a CQ manager (CQM) 522, and a buffer pointer manager (BPM) 524. When the doorbell is rung, the SQM 520 reads the relevant command from the either the host device 104 or the CMBs 530A-530C, 532. The BPM 524 then reads the PRP tables and the DMA 518 executes the read or write command. When data transfer is complete, the CQM 522 writes a completion notification and the INL 516 sends an interrupt.

Figure 6A:
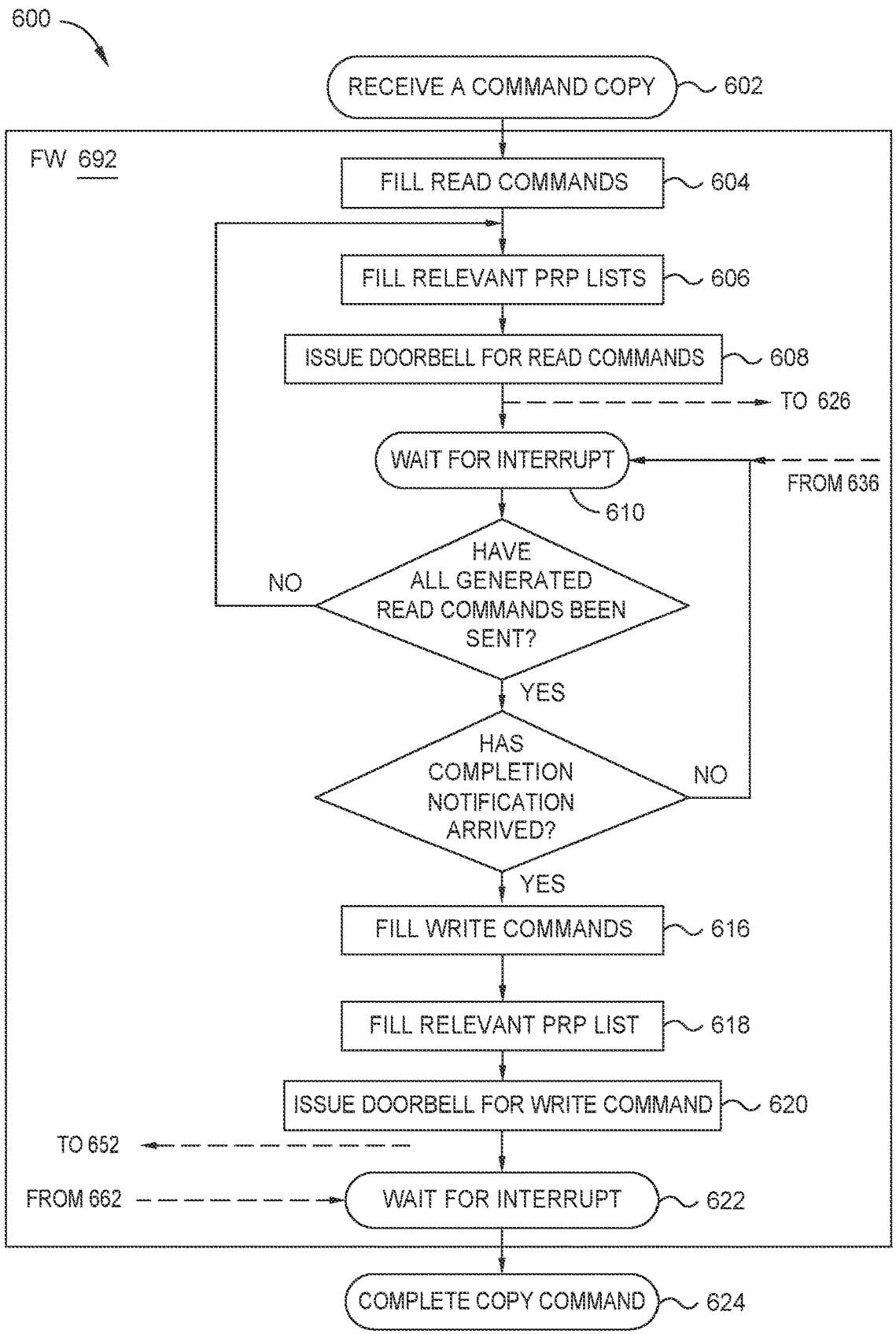

FIGS. 6A-6C are a method 600 illustrating a copy command flow chart, according to disclosed embodiments. Aspects of FIG. 5 may be referred to aid in the exemplification of the method 600. Furthermore, the method 600 may describe the flow path 2 of FIG. 5. At block 602, the CPU 542 receives a copy command. The CPU 542 generates a plurality of read commands to the local CMB 532 at block 604 and fills the relevant PRP lists in the local CMB 532 at block 606. The CPU 542 issues a first doorbell associated with the one or more second virtual functions for the read commands at block 608. At block 610, the CPU waits for a first interrupt to arrive.

While waiting for the first interrupt to arrive, the controller 108 detects the first doorbell and informs the SQM 520 at block 626. At block 628, the SQM 520 fetches the plurality of read commands from the local CMB 532. At block 630, the BPM 524 reads the relevant PRP lists from the local CMB 532. At block 632, the DMA reads the data associated with the plurality of read commands from the NVM and programs the data associated with the read commands to the local CMB 532. At block 634, the CQM 522 issues a first completion notification to the local CMB 532 and the INL 516 generates and sends a first interrupt to the local CPU mailbox 526 at block 636.

After the CPU 542 receives the first interrupt at the local CPU mailbox 526, the CPU 542 determines if all generated read commands associated with copy command received at block 602 have been sent to the local CMB 532 at block 612. If not all read commands have been sent to the local CMB 532, then the method 600 returns to block 606. However, if all of the read commands have been sent to the local CMB 532, then the CPU 542 determines if the first completion notification has arrived from the CQM 522. If the first completion notification has not arrived, then the method returns to block 610. However, if the first completion notification has arrived, then the CPU 542 generates a write command to the local CMB 432 at block 616 and fills the relevant PRP lists in the local CMB 432 at block 618. At block 620, the CPU issues a second doorbell for the write command. At block 622, the CPU 542 waits for a second interrupt to arrive.

While waiting for the second interrupt to arrive, the controller 108 detects the second doorbell and informs the SQM 520 at block 652. At block 654, the SQM 520 fetches the write command from the local CMB 532. At block 656, the BPM 524 reads the relevant PRP lists from the local CMB 532. At block 658, the DMA writes the data associated with the write command to the NVM from the local CMB 532. At block 660, the CQM 522 issues a second completion notification to the local CMB 532 and the INL 516 generates and sends a second interrupt to the local CPU mailbox 526 at block 662.

After the CPU 542 receives the second interrupt at block 622, the copy command is completed at block 624. During the method 600 process, other read or write operations, such as a read or write command from the host, may be concurrently completed because the resources of each virtual function of the plurality of virtual functions (i.e., the one or more first virtual functions and the one or more second virtual functions) are isolated from each other. In one embodiment, the method 600 describes a method of garbage collection. In other embodiments, the method 600 describes a storage management operation that the data storage device may initiate. For example, the method 600 may refer to copying a data from a first location in the NVM 110 to a second location in the NVM 110.

By including one or more second virtual functions only accessible by the firmware or the CPU of the data storage device, the data storage device initiated operations flows and the operation flows of the data storage device initiated by the host device may be interleaved and the performance of the data storage device may be enhanced.

In one embodiment, a data storage device includes a non-volatile storage unit and a volatile memory unit, including one or more first volatile memory locations, one or more second volatile memory locations and a controller memory buffer (CMB). The data storage device further includes a controller coupled to the non-volatile storage unit and the volatile memory unit. The controller is configured to receive one or more read, write, or copy commands from a host to read data from, write data to, or both to/from the non-volatile storage unit, route the received one or more read or write commands to one or more first virtual function locations, and utilize the CMB to copy the data from a first location of the non-volatile storage unit to a second location of the non-volatile storage unit, where copying the data from the first location to the second location utilizes one or more second virtual function locations.

The data storage device further includes an inbound multiplexer (mux) module, such as an advanced extensible interface (AXI), where the inbound mux module is configured to filter one or more inbound host read or write commands to the controller. The data storage device further includes a central processing unit (CPU), where the CPU is configured to utilize the AXI inbound mux module to access the one or more second volatile memory locations. The one or more first virtual function locations are accessible by the host. The one or more second virtual function locations are hidden from the host. The copying of the data further includes executing a plurality of read commands for a plurality of data stored in the non-volatile storage unit and executing a first write command to write the plurality of data associated with the plurality of read commands into a contiguous area of the non-volatile storage unit.

In another embodiment, a data storage device, including a non-volatile storage unit and a volatile memory unit, including one or more first volatile memory locations, one or more second volatile memory locations, and a controller memory buffer (CMB). The data storage device further includes an inbound multiplexer (mux), and a controller coupled to the non-volatile storage unit, the volatile memory unit, and the AXI inbound mux. The data storage device further includes a central processing unit (CPU) coupled to the controller, where the CPU is configured to receive a copy command or a self-generated garbage collection decision from the controller, generate a plurality of read commands, write the plurality of read commands to the CMB, generate physical region page (PRP) or scatter gather lists (SGLs) for the plurality of read commands pointing to the CMB, issue a first doorbell for the plurality of read commands, generate a first write command, generate PRPs for the first write command pointing to the CMB, issue a second doorbell for the first write command, and program the data associated with the first write command to the non-volatile storage.

The CPU, after issuing a first doorbell, is further configured to wait for a first interrupt to arrive from the controller. The reading includes detecting, by the controller, the first doorbell and informing a submission queue manager, fetching, by the submission queue manager, the plurality of read commands from the CMB, reading, by a buffer pointer manager (BPM), relevant PRPs from the CMB, reading, by a direct memory access (DMA), the data associated with the plurality of read commands from the non-volatile storage unit to the CMB, programming, by a completion queue manager (CQM), a first completion notification to the CMB, and programming, by an interrupt logic (INL), a first interrupt message to a CPU mailbox, wherein the CPU includes the CPU mailbox. The CPU waits to receive the first interrupt message, where the CPU is configured to determine if the plurality of read commands has been written to the CMB. The CPU further determines if the first completion notification has arrived. The writing includes detecting, by the controller, the second doorbell and informing a submission queue manager, fetching, by the submission queue manager, the first write command from the CMB, reading, by a buffer pointer manager (BPM), the relevant PRPs from the CMB, writing, by a direct memory access (DMA), data associated with the first write command to the non-volatile storage unit to the CMB, programming, by a completion queue manager (CQM), a second completion notification to the CMB, and programming, by an interrupt logic (INL), a second interrupt message to a CPU mailbox, wherein the CPU comprises the CPU mailbox. The CPU waits to receive the second interrupt message. The receiving the second interrupt message corresponds to completing the copy command received by the controller.

In another embodiment, a data storage device includes a non-volatile storage unit, a volatile memory unit, including one or more first volatile memory locations and one or more second volatile memory locations, means to route one or more read or write commands received from a host to one or more first virtual function locations, where the one or more first virtual function locations completes the one or more read or write commands received, and a controller memory buffer (CMB) to copy data from a first location of the non-volatile storage unit to a second location of the non-volatile storage unit, where copying the data from the first location to the second location utilizes one or more second virtual function locations.

The CMB is a portion of the volatile memory unit. The volatile memory unit comprises a plurality of CMBs. The at least one CMB of the plurality of CMBs are hidden from the host. The data storage device further includes an inbound multiplexer (mux). The data storage device further includes a plurality of registers coupled to the inbound mux.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a non-volatile storage unit;
   a volatile memory unit, comprising a controller memory buffer (CMB), wherein:
   the CMB comprises one or more first volatile memory locations associated with one or more first virtual functions and one or more second volatile memory locations associated with one or more second virtual functions;
   each first virtual function of the one or more first virtual functions are each associated with a virtual host of a host;
   each of the one or more first virtual functions are associated with a respective first set of resources of the data storage device;
   each of the one or more second functions are associated with a respective second set of resources of the data storage device distinct from the first set of resources;
   the second set of resources are not accessible by the host; and
   the one or more second virtual functions are configured to copy previously stored data associated with the one or more first virtual functions from a first location of the non-volatile storage unit to a second location of the non-volatile storage unit; and a controller coupled to the non-volatile storage unit and the volatile memory unit, and the controller is configured to:
  receive one or more read, write, or copy commands from the host to read data from, write data to, or both to/from, the non-volatile storage unit;
  route the received one or more read or write commands to one or more first virtual function locations; and
  utilize the one or more second volatile memory locations of the CMB to copy the data, wherein copying the data comprises moving data from the first location of the non-volatile storage unit to the second location of the non-volatile storage unit utilizing the one or more second virtual functions, wherein routing the received one or more read or write commands and executing the received one or more read or write commands occurs concurrently with utilizing the one or more second volatile memory locations of the CMB to copy the data.

2. The data storage device of claim 1, further comprising an advanced extensible interface (AXI) inbound multiplexer (mux) module, wherein the AXI inbound mux module is configured to filter one or more inbound host read or write commands to the controller.

3. The data storage device of claim 2, further comprising a central processing unit (CPU), wherein the CPU is configured to utilize the inbound mux module to access the one or more second volatile memory locations.

4. The data storage device of claim 1, wherein the one or more first virtual function locations are accessible by the host.

5. The data storage device of claim 1, wherein the one or more second virtual function locations are hidden from the host.

6. The data storage device of claim 1, wherein copying the data further comprises executing a plurality of read commands for a plurality of data stored in the non-volatile storage unit and executing a first write command to write the plurality of data associated with the plurality of read commands into a contiguous area of the non-volatile storage unit.

7. A data storage device, comprising:
  a non-volatile storage unit;
  a volatile memory unit, comprising a controller memory buffer (CMB), wherein:
    the CMB comprises one or more first volatile memory locations associated with one or more first virtual functions and one or more second volatile memory locations associated with one or more second virtual functions;
    each first virtual function of the one or more first virtual functions are each associated with a virtual host of a host;
    each of the one or more first virtual functions are associated with a respective first set of resources of the data storage device;
    each of the one or more second functions are associated with a respective second set of resources of the data storage device distinct from the first set of resources;
    the second set of resources are not accessible by the host; and
    the one or more second virtual functions are configured to copy previously stored data associated with the one or more first virtual functions from a first location of the non-volatile storage unit to a second location of the non-volatile storage unit;
  an advanced extensible interface (AXI) inbound multiplexer (mux);
  a controller coupled to the non-volatile storage unit, the volatile memory unit, and the AXI inbound mux; and
  a central processing unit (CPU) coupled to the controller, wherein the CPU is configured to:
    receive a copy command or a self-generated garbage collection decision from the controller;
    generate a plurality of read commands for data stored in the first location in the non-volatile storage unit, wherein the data is associated with the one or more first virtual functions;
    write the plurality of read commands to the CMB utilizing the one or more second virtual functions;
    generate physical region page (PRP) or scatter gather lists (SGLs) for the plurality of read commands pointing to the CMB;
    issue a first doorbell for the plurality of read commands;
    generate a first write command;
    generate PRPs for the first write command pointing to the CMB;
    issue a second doorbell for the first write command; and
    program the data associated with the first write command to the second location of the non-volatile storage utilizing the one or more second virtual functions, wherein the second location is different from the first location, wherein programming the data associated with the first write command to the second location of the non-volatile storage utilizing the one or more second virtual functions occurs concurrently with performing commands associated with the one or more first virtual functions.

8. The data storage device of claim 7, wherein the CPU, after issuing a first doorbell, is further configured to wait for a first interrupt to arrive from the controller.

9. The data storage device of claim 8, wherein reading comprises:
  detecting, by the controller, the first doorbell and informing a submission queue manager;
  fetching, by the submission queue manager, the plurality of read commands from the CMB;
  reading, by a buffer pointer manager (BPM), relevant PRPs from the CMB;
  reading, by a direct memory access (DMA), the data associated with the plurality of read commands from the non-volatile storage unit to the CMB;
  programming, by a completion queue manager (CQM), a first completion notification to the CMB; and
  programming, by an interrupt logic (INL), a first interrupt message to a CPU mailbox, wherein the CPU comprises the CPU mailbox.

10. The data storage device of claim 9, wherein the CPU is configured to determine if the plurality of read commands has been written to the CMB when the CPU receives the first interrupt message.

11. The data storage device of claim 10, wherein the CPU further determines if the first completion notification has arrived.

12. The data storage device of claim 9, wherein writing comprises:
  detecting, by the controller, the second doorbell and informing a submission queue manager;
  fetching, by the submission queue manager, the first write command from the CMB;

reading, by a buffer pointer manager (BPM), the relevant PRPs from the CMB;

writing, by a direct memory access (DMA), data associated with the first write command to the non-volatile storage unit to the CMB;

programming, by a completion queue manager (CQM), a second completion notification to the CMB; and programming, by an interrupt logic (INL), a second interrupt message to a CPU mailbox, wherein the CPU comprises the CPU mailbox.

13. The data storage device of claim 12, wherein the CPU is further configured to receive the second interrupt message.

14. The data storage device of claim 13, wherein receiving the second interrupt message corresponds to completing the copy command received by the controller.

15. A data storage device, comprising:
non-volatile storage means;
volatile memory means comprising one or more first volatile memory locations and one or more second volatile memory locations; and
a controller coupled to the non-volatile storage means and the volatile storage means, wherein the controller comprises a controller memory buffer (CMB), wherein:
the CMB comprises one or more first volatile memory locations associated with one or more first virtual functions and one or more second volatile memory locations associated with one or more second virtual functions;
each first virtual function of the one or more first virtual functions are each associated with a virtual host of a host;
each of the one or more first virtual functions are associated with a respective first set of resources of the data storage device;
each of the one or more second functions are associated with a respective second set of resources of the data storage device distinct from the first set of resources;
the second set of resources are not accessible by the host; and
the one or more second virtual functions are configured to copy previously stored data associated with the one or more first virtual functions from a first location of the non-volatile storage means to a second location of the non-volatile storage means, and wherein the controller is configured to:
route one or more read or write commands received from the host to one or more first virtual function locations, wherein the one or more first virtual function locations completes the one or more read or write commands received; and
use the one or more second volatile memory locations of the CMB to copy data, wherein copying the data comprises moving data from the first location of the non-volatile storage means to the second location of the non-volatile storage means utilizing the one or more second virtual functions, wherein routing the one or more read or write commands occurs concurrently with using the one or more second volatile memory locations of the CMB to copy the data.

16. The data storage device of claim 15, wherein the CMB is a portion of the volatile memory means.

17. The data storage device of claim 16, wherein the volatile memory means comprises a plurality of CMBs.

18. The data storage device of claim 17, wherein at least one CMB of the plurality of CMBs are hidden from the host.

19. The data storage device of claim 15, further comprising an inbound multiplexer (mux).

20. The data storage device of claim 19, further comprising a plurality of registers coupled to the inbound mux.

* * * * *